United States Patent [19]
Yamaguchi et al.

[11] Patent Number: 4,710,964
[45] Date of Patent: Dec. 1, 1987

[54] PATTERN RECOGNITION APPARATUS USING OSCILLATING MEMORY CIRCUITS

[75] Inventors: Youko Yamaguchi; Hiroshi Shimizu; Ichiro Tsuda, all of Tokyo; Masafumi Yano, Chiba; Tokiko Okumura, Tokyo, all of Japan

[73] Assignee: Research Development Corporation of Japan, Tokyo, Japan

[21] Appl. No.: 882,470

[22] Filed: Jul. 7, 1986

[30] Foreign Application Priority Data

Jul. 6, 1985 [JP] Japan .......................... 60-149034[U]

[51] Int. Cl.⁴ ............................................. G06K 9/48
[52] U.S. Cl. ...................................... 382/17; 382/21; 382/29; 365/94
[58] Field of Search .................... 382/21, 17, 29, 64

[56] References Cited

U.S. PATENT DOCUMENTS

| | | | |
|---|---|---|---|
| 3,297,993 | 12/1963 | Clapper | 382/22 |
| 3,332,064 | 7/1967 | Marsch | 382/17 |
| 3,482,211 | 12/1969 | De Claris et al. | 382/17 |
| 3,509,534 | 4/1970 | Partin | 382/17 |
| 3,629,849 | 12/1971 | Sauvan | 382/21 |

*Primary Examiner*—Leo H. Boudreau
*Assistant Examiner*—Steven Brim
*Attorney, Agent, or Firm*—Kerkam, Stowell, Kondracki & Clarke

[57] ABSTRACT

A pattern recognition apparatus includes a pattern preprocessing part having a plurality of outputs, and a clock oscillator, an information consolidator and a memory having a plurality of nonlinear oscillating circuits, respectively. Each of the oscillating circuits includes a plurality of inputs for controlling the oscillation condition and at least one output. In the information consolidator, the output of each oscillating circuit is interconnected to predetermined inputs of other oscillating circuits in a predetermined relation, and the inputs of the oscillating circuits are coupled to the outputs of the pattern preprocessing part in a predetermined distribution. The clock oscillator receives, as a main exciting signal, the sum of a group of signals obtained by phase-adjusting the output of a substantial part of oscillating circuits contained in the information consolidator. In the memory, the respective oscillating circuits receive as a main exciting signal the output of the clock oscillator, and these oscillating circuits are divided into a predetermined number of groups so that the sum of the outputs of the oscillating circuits in each group gives an elementary signal of a pattern reference memory data. In addition, there is provided a waveform comparator for comparing the elementary signal of the memory data with the direct sum of the outputs of the above mentioned substantial part of oscillating circuits in the information consolidator, so that the result of comparison is applied to inputs of the oscillating circuits of the memory.

5 Claims, 26 Drawing Figures

0°

45°

90°

135°

(a)

(b)

(c)

(a)

(b)

(a)

(b)

(c)

PATTERN RECOGNITION APPARATUS USING OSCILLATING MEMORY CIRCUITS

BACKGROUND OF THE INVENTION

1. Field of the Invention

The present invention relates to a pattern recognition apparatus, and more specifically to a general pattern recognition apparatus which can be applied to extract the characteristics from not only input images such as figures and letters but also other various matters changing in a time series.

2. Description of Related Art

At present, so-called pattern recognition apparatuses are widely used in an industrial field, for example as apparatuses for reading letters and systems for sorting components. The feature of recognition method common to the conventional apparatuses is to firstly extract various characteristics, which are commonly contained in a group of objects to be recognized, from the input pattern data, and then to categorize on the basis of the extracted characteristics.

The processing part of such recognition apparatuses comprises a digital processor and a special circuit which quantitatively extracts specific characteristics, such as a high speed Fourier transformation circuit. The program for the digital processor can be designed according to the objects for recognition. Such a recognition apparatus is specialized to meet the very first industrial demand for a high-speed recognition.

On the other hand, the specialization of the recognition apparatus makes it necessary to design an apparatus and a program for each recognition object category. As a result, the related techniques are more specialized, and design and modifications works have become more complicated. Furthermore, the complication of category classification processing lowers the reliability of recognition results, resulting in more difficult quality control of products manufactured in the production system using the pattern recognition system.

On the viewpoint of the manufacturer's side, this follows that a high degree of design work is required for each of specifications of orders received, and that the cost of the product including training of engineers becomes higher.

On the viewpoint of the user's side, there exist disadvantages on the technical point and the cost of use such that the technical information on the recognition objects themselves which the user wants to maintain confidential can flow out to the maker's side, and the user is forced to frequently change the apparatus to a new model with improved function.

As above-described, the pattern recognition apparatus has encountered with disadvantages of the specialization and complication.

SUMMARY OF THE INVENTION

Accordingly, it is one object of the present invention to provide a general pattern recognition apparatus having solved the above mentioned various disadvantages of the conventional apparatus.

Another object of the present invention is to provide a novel pattern recognition apparatus wherein the structures of software and hardware are quite independent of the recognition object category.

A still further object of the present invention is to provide such a pattern recognition apparatus that the reduction of cost, improvement of product reliability and shortening in time of delivery can be attained owing to a mass production of a selected few kind of systems adapted to various recognition objects.

A further object of the present invention is to provide such a pattern recognition apparatus that the pattern information can be accumulated independently of makers and a function can be improved with addition of a single-structure unit.

Such specialization and complication attendant upon the improvement of accuracy of the pattern recognition apparatus cannot be avoided as long as the conventional recognition method is adopted in which various characteristics common to a group of recognition objects are extracted out of input pattern data in the operational way are then collated with reference data so as to be finally categorized.

The inventors, therefore, proceeded with the studies in various ways on the recognition process of human beings and other creatures in order to effectuate a pattern recognition method different from the basic concept of the conventional pattern recognition apparatus. The inventors have found that the recognition method of human beings and other creatures is surely quite different from the data processing in the conventional pattern recognition apparatus.

A living body receives, in the five senses including the sense of sight, various stimuli from the external environment, then interprets them according to the experience making use of a brain and a nervous plexus, and finally memorizes them if necessary. A living body can also give a certain interpretation to inexperienced matters. Moreover, the interpretation is not only based on the incoming but also is influenced by the internal condition such as the internal secretion and sickness. There is no doubt at all that the above special recognition capacity makes it possible for the life to withstand for such a long time as several $10^9$ years without any discontinuity.

The structure of the brain and nervous plexus having the above-mentioned capacity is partially specialized for each recognition object. The most part of the structure, however, is a kind of large-scaled nervous system composed of a large number of single-structural neuropils interconnected with each other. According to the cranial nerve physiology, each of the nerve cells organizing the neuropil receives the electrical stimuli from several thousands to several ten thousands of other nerve cells, and generates electrical impulses to itself and to a large number of other nerve cells. The generation of the electrical impulses is called "firing".

The condition of such firing of nerve cells depends on the internal condition of the cells themselves and the stimulus inputted. On the other hand, since it is considered that the whole brain executes a certain recognition processing, it can be understood that the firing of even a single nerve cell can be a result of the partial interpretation processing.

On the viewpoint of the othe side, it seems that above nerve cells interchanges the electrical impulses with each other and the method for application of such impulses is divided into two manners: the first is to restrain the firing and the second is to facilitate the firing. The brain can, therefore, be regarded as having a circuit network having positive feedback control circuits, negative feedback control circuits and oscillation circuits. In fact, it can be understood that the brain performs the recognition processing and other activities while oscillating, because there are observed the electrical brain waves showing the condition of activity as the whole.

Furthermore, the human brain is quite complicated and composed of more than $10^8$ nerve cells. It is known from the anatomical viewpoint that these cells are interconnected with each other, not in a random way but in a repeated way in which the same patterns are repeated in the order of several tens to several thousands.

The above description shows the characteristics of the hardware of the brain at the pattern recognition apparatus.

The description will be hereinafter devoted to the aspect as the software of the action of the brain. The change in spatial and time distribution of the firing of the neuropils caused by the stimuli from the inside and outside of a living body, seems to show the progress of the interpretation processing inside the brain, that is, the recognition software and the transfer of the information processed therein. The features of a brain different from a digital processor are that: (1) the program and data are not stored separately, (2) data processing is executed in completely parallel at various local neuropils and the output can be obtained in harmony as a whole.

A detailed description is made hereinafter for the program and data not being stored separately. The program and data are should be regarded to be substantially stored separately in a digital processor, because the processor clearly distinguishes between the data and the instruction in the course of execution of processing based on the program and data although they are stored mixedly in a memory device. On the other hand, a brain is neither a digital processor of such stored program type nor a discrete logical circuit in the conception opposite to the above digital processor. The neuropils have a special structure so that the progress of data processing may produce the new experience and consequently a new data processing structure.

As far as the parallel data processing on neuropils in harmony as the whole are concerned, a total evaluation is given by the following characteristics. Since the respective firing conditions in local groups of nerve cells are in cooperation to produce one overall harmony, each group of local nerve cells has somehow the information on the whole condition and the object. Each nerve cell group receives the information from other nerve cell groups with a time delay in comparison with the information which the nerve cell group itself receives from external. Such a feature is a kind of pattern recognition in a wide sense including not only visual recognition but also other recognitions such as audio recognition, and moreover, has no substantial disadvantages inherent to the conventional pattern recognition apparatus. Namely, since the store of recognition experiences automatically produces an improved recognition software for possible next recognition operation, it is not necessary to give a new software for the next object given from outside. And, although the brain or each neuropil is composed of repeated units of the same structure on the viewpoint of hardware, the brain can cope with the change of the recognition function.

Paying attention to the remarkable pattern recognition capacity and their characteristic structure of a living body, the inventors have originated a recognition apparatus.

FIG. 1 shows the above pattern recognition method of a living body, in the form of function blocks. The pattern recognition apparatus comprises a pattern preprocessing part 1, an information consolidator 2, and a memory 3. The input signal from a recognition object 4 is transformed into the output signal called "elementary information" by the pattern preprocessing part 1 and then inputted to the information consolidator 2. The consolidator 2 transmits an output signal 6 to the memory 3 and simultaneously receives a feedback signal 7 from the memory 3. The pattern preprocessing part 1 and the information consolidator 2 are composed respectively of a plurality of elementary units 1a and of a plurality of elementary unit circuits 2a. The memory 3 is composed of a plurality of elementary units as will be described hereinafter.

Moreover, the input signal 4 is not limited in kind and can be all kinds of information having any distinguishable characteristics such as sounds and visual images.

The pattern preprocessing part 1 analyses or transforms the input signal 4 and expands it into the multi-dimensional spatial distributions with respect to the various properties such as length, position, and light and darkness.

In the example shown in FIG. 1, the input signal is expanded into two-dimensional space (p,q). The figure also shows that as a two-dimensional solution of the input signal given in the pattern preprocessor 1, the change appears in the outputs of the corresponding elementary units marked "*" of the elementary units 1a. Namely, the distribution pattern reveals a inverted L-shaped pattern.

Such a distribution pattern is inputted as an elementary information signal 5 to the information consolidator 2. This information consolidator 2 transforms an output signal from the patttern preprocessing part 1 into a signal integrated in a time series, (that is, an signal changing with the time). The information consolidator 2 is composed of a stack of layers, each layer consisting of a plurality of elementary unit circuits 2a which will be called "simple cells" hereinafter.

Each simple cell is reactive or responsive to the inclination of segments indicated by the marks "*" on the plane (p,q) in the preprocessing part 1. Each horizontal layer of the simple cells is the plane to which the condition of the plane (p,q) of the pattern preprocessing part 1 is projected in parallel, and is here called "hyperplane". On the other hand, a line of simple cells in the vertical direction contains simple cells respectively corresponding to different inclinations (max. 180 degrees) of possible segments indicated by the marks "*" on the projected plane (p,q). Each column of simple cells is here called "hypercolumn". In the pattern recognition apparatus in FIG. 1, the cells of each hypercolumn correspond to 0°, 45°, 90°, 135° respectively from above to below, as shown in FIG. 1A. Assuming that the input signal 5 given by the pattern preprocessing part 1 is formed by the segments of the inclination 0° and 90°, the reacting simple cells are ones designated with mark "*". It has been understood that in the brain a number of nerve cell groups are fired according to the inclination of each segment of outlines of the image projected in plane on the retina.

There is no doubt at all that the distribution pattern of the reacting cells in the information consolidator 2 reveals the characteristics inherent to the input signal 4. The reaction distribution pattern involves the absolute position of each reacting simple cell in the information consolidator (for example, the position in the three-dimensional coordinates) and the relative positional relationship between reacting cells (for example, distance and direction).

Furthermore, it is essential in the recognition processing that such reaction is affected by the content of the information existing in the memory 3. The recognition processing of a living body is, therefore, to decide the final state of all the cells by mixing up the reaction pattern and the content of the memory.

On the basis of this knowledge, the inventors have proceeded with the research on an apparatus capable of executing the same recognition processing as a living body. The inventors finally made a success of developing a pattern recognition apparatus comprising the functional structure mentioned above and shown in FIG. 1, and being capable of the recognition processing, without any artificial programming, by mixing up the reaction pattern and the content of the memory so as to decide the final state of the cells.

The inventors reached to an idea to replace each of the simple cells which constitute the information consolidator and the memory, by a so-called nonlinear oscillation circuit.

Namely, there is provided in accordance with the present invention a pattern recognition apparatus which includes a pattern preprocessing part having a plurality of outputs, and a clock oscillator, and an information consolidator and a memory which include a plurality of nonlinear oscillating circuits. Each of the oscillating circuits includes a plurality of inputs for controlling the oscillation condition and at least one output. In the information consolidator, the output of each oscillating circuit is interconnected to predetermined inputs of other oscillating circuits in a predetermined relation, and the inputs of the oscillating circuits are coupled to the outputs of the pattern preprocessing part in a predetermined distribution. The clock oscillator receives, as a main exciting signal, the sum of a group of signals obtained by phase-adjusting the outputs of a substantial part of oscillating circuits contained in the information consolidator. In the memory, the respective oscillating circuits receive as a main exciting signal the output of the clock oscillator, and these oscillating circuits are divided into a predetermined number of groups so that the sum of the outputs of the oscillating circuits in each group gives an elementary signal of a pattern reference memory data. In addition, there is provided waveform comparison means for comparing the elementary signal of the memory data with the direct sum of the outputs of the above mentioned substantial part of oscillating circuit in the information consolidator, so that the result of comparison is applied to inputs of the oscillating circuits of the memory.

As far as the nonlinear oscillation circuit is concerned, various types of circuits are well known and have been put into practice in various fields. The common characteristics of the existing nonlinear oscillating circuits is that they are able to generate quite complicated oscillating waves because the next following state is defined by the combination of the internal and extenal conditions of the circuit at each moment. Thus, a plurality of external input terminals and an output terminal are provided to each simple cell and are interconnected between the simple cells so as to form a nonlinear oscillating circuit network in which the respective cell are interfered with each other in a complicated way. The information consolidator is composed of such nonlinear oscillation circuit networks.

Explaining with reference to FIG. 1, the resultant operation pattern of the information consolidator 2 composed of the nonlinear oscillation circuit networks and receiving the inputs signals 5 and 7 is formed by the mixed information of the content of the memory and the reaction pattern of the information consolidator itself. The information consolidator, therefore, supplies the output signal 6 indicative of the resultant operation pattern, as the result of the characteristics extraction processing.

Moreover, the memory 3 also acts to memorize the pattern appearing in the information consolidator 2, and is composed of a plurality of unitary memories corresponding to the elements constituting the patterns. Each unitary memory is an appropriate oscillation circuit capable of generating an arbitrary wave form of signal.

This unitary memory is not of a digital type such as memory cells for a normal digital system, which stores the voltages corresponding to the values "1" and "0", but one in which oscillation condition becomes the content of memory itself. The fundamental structure of the memory is similar to that of the hypercolumn consisting of simple cells.

All of the unitary memories receive the signal 6 in parallel and compare the signal 6 with the oscillating pattern which each unitary memory has. The result of such comparison is transmitted to the information consolidator as the signal 7 so as to emphasize the oscillation of the corresponding reaction simple cells.

Thus, the above process is circularly repeated in a loop starting from the information consolidator 2, passing through its output 6 to the memory 3 and returning through its output 7 to the information consolidator 2. As a result, the oscillation is preferentially emphasized in the unitary memories which are in higher agreement with the corresponding cells in the information consolidator, and on the other hand, the oscillation is finally weakened in the other unitary memories. Thus the recognition result is confirmed.

In other words, the principal feature of the present recognition processing relies on two kinds of memory functions: one is the function that the oscillation mode before interference of the nonlinear oscillation circuits is a main factor to decide the future oscillation mode; and the other in such a memory function that the oscillation pattern having been affected by the interference once can still remain. The present pattern recognition, therefore, is the one where the operation condition of the circuit involves both the content of the memory and the process of the information processing simultaneously.

The above and other objects, features and advantages of the present invention will be apparent from the following description of preferred embodiments of the invention with reference to the accompanying drawings.

DESCRIPTION OF THE PREFERRED EMBODIMENTS

Figure 1:
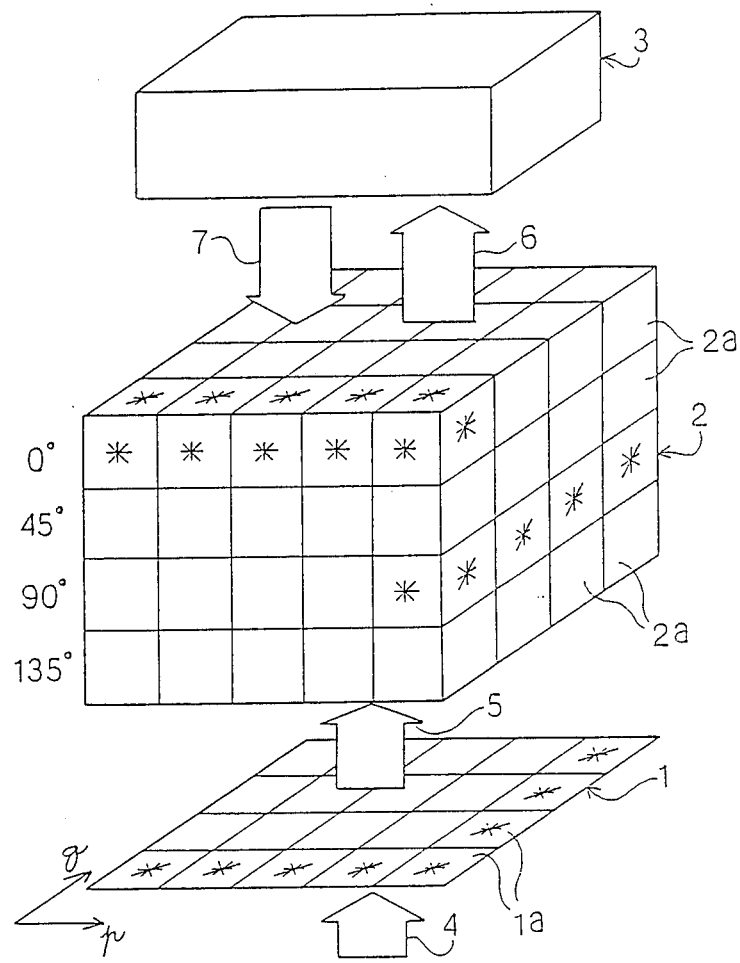
FIG. 1 is a function block diagram illustrating the fundamental idea involved in the pattern recognition apparatus in accordance with the present invention.
Figure 1A:
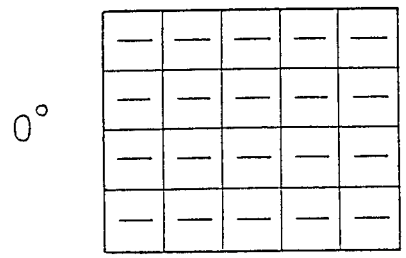
FIG. 1A illustrates the directivity of the simple cells contained in the information consolidator of the pattern recognition system shown in FIG. 1.
Figure 1A:
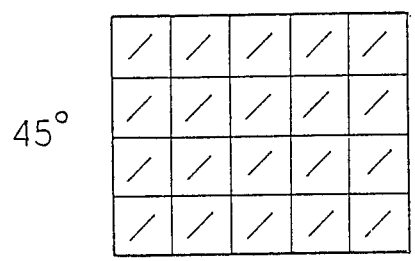
Figure 1A:
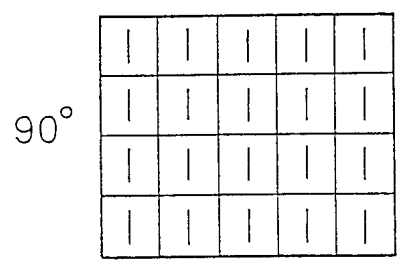
Figure 1A:
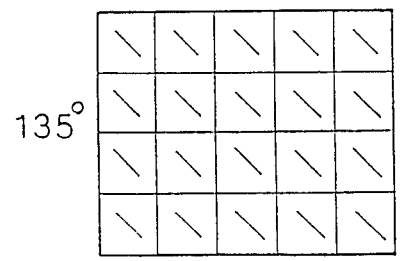
Figure 2:
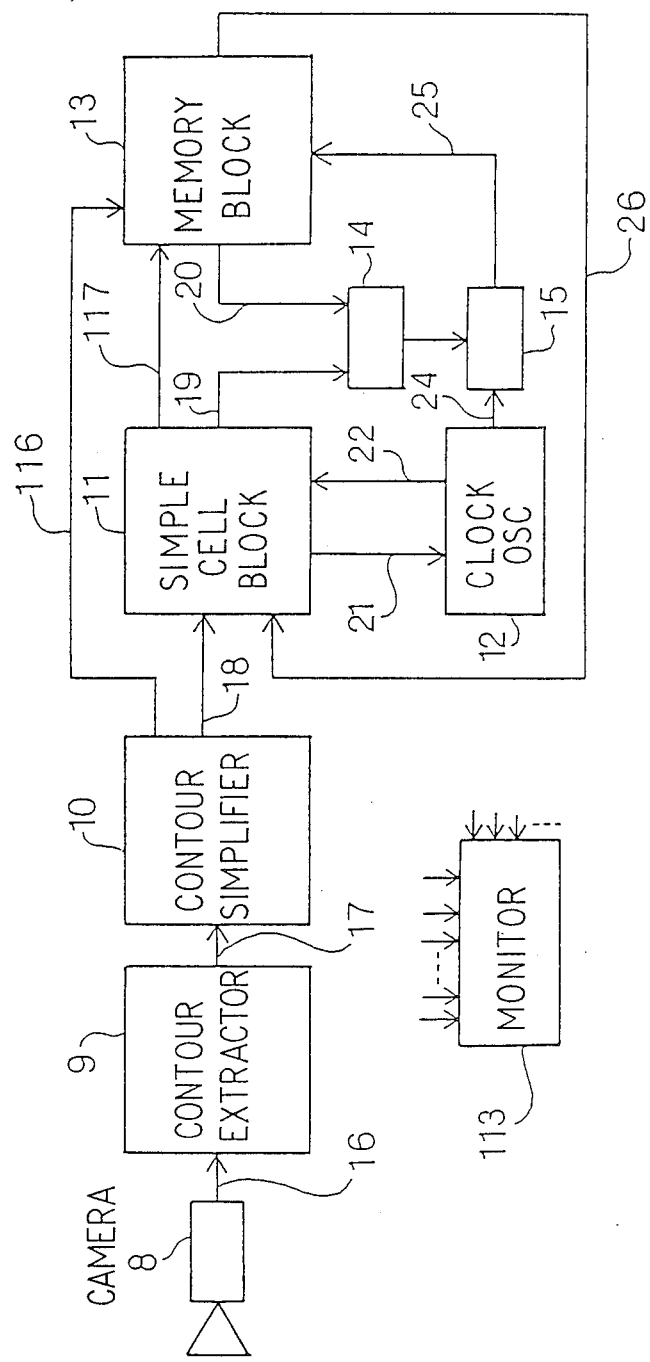
FIG. 2 is a block diagram showing the basic structure of a pattern recognition apparatus in accordance with the present invention.

Referring to FIG. 2, there is shown the basic structure of an embodiment of the pattern recognition apparatus in accordance with the present invention. The shown apparatus comprises a camera 8 detecting an object to be recognized, a contour line extracting circuit 9 connected to receive a video signal 16 from the camera 8, and a contour simplifier 10 connected to an output 17 of the contour extractor 9 and adapted to simplify the extracted contour. These means 8, 9 and 10 constitutes the pattern preprocessing part 1 shown in FIG. 1. The ouput 18 of the contour simplifier 10 is connected to a simple cell block 11 which functions as the information consolidator 2 shown in FIG. 1. This simple cell block 11 receives a clock signal 22 from a clock oscillator 12 and also supplies an output signal 21 to the clock oscillator 12. Another output 117 of the simple cell block 11 is connected to a memory block 13 corresponding to the memory 3 shown in FIG. 1. The simple cell block 11 and the memory block 13 are connected at their outputs 19 and 20 to a comparator 14 whose output is connected to one input of a memory clock generator 15. This memory clock generator 15 is also connected at its other input to another output 24 of the clock oscillator 12 and operates to generate a memory clock signal 25 to the memory block 13. The memory block 13 has an output 26 connected to the simple cell block 11 and is connected to receive an output signal 116 of the contour simplifier 10. Further, there is provided an operation monitor 133 connected to various circuits 8 to 15.

The contour extracter 9 receives the video signal 16 from the camera 8 and operates to extract a contour line of the object to be recognized, from a black-and-white distribution on an image plane produced by the video signal 16. A typical method for extracting the contour line is a differentation of the black-and-white data, which is wellknown to persons skilled in the art and therefore explanation will be omitted.

Figure 3:
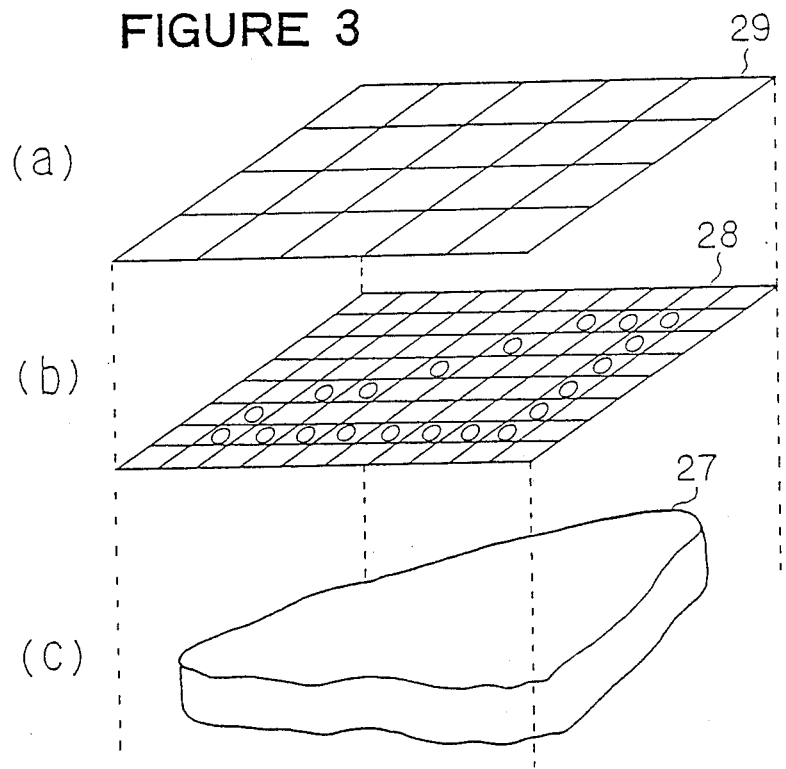
FIG. 3 illustrates the relation among an object to be recognized, a pattern supplied to the pattern preprocessing part but not yet treated in the pattern preprocessing part, and a matrix of simple cells in the information consolidator.

FIG. 3 shows one example of the contour extraction. If an object 27 as shown in FIG. 3(c) is detected by the camera 8, the contour extractor 9 outputs a contour signal 17 which represents a triangular contour as shown in FIG. 3(b) on an imaginary plane 28 in which the contour is drawn by small circles.

The contour simplifier 10, which receives the contour signal 17, has a matrix of outputs forming an image plane 29 whose mesh is larger or coarser than that of the imaginary contour plane 28, as shown in FIG. 3(a). This contour simplifier 10 acts to examine on the basis of the output data from the contour extracter 9, whether or not the contour passes through the respective meshes of the image plane 29. Thus, the outputs corresponding to the respective meshes of the plane 29 are supplied as simplified contour signal 18 to the simple cell block 11.

This contour simplifier 10 can be easily constructed in a wellknown way, and therefore, further explanation on the internal structure of the simplifier 10 will be omitted.

Next, explanation will be made on the simple cell block 11, the clock oscillator 12 and the memory block 13, which are respectively constituted of nonlinear oscillators common to the three circuits 11, 12 and 13. This is one important feature of the present invention, and the common nonlinear oscillator will be called "unitary oscillator" hereinafter.

Figure 4:
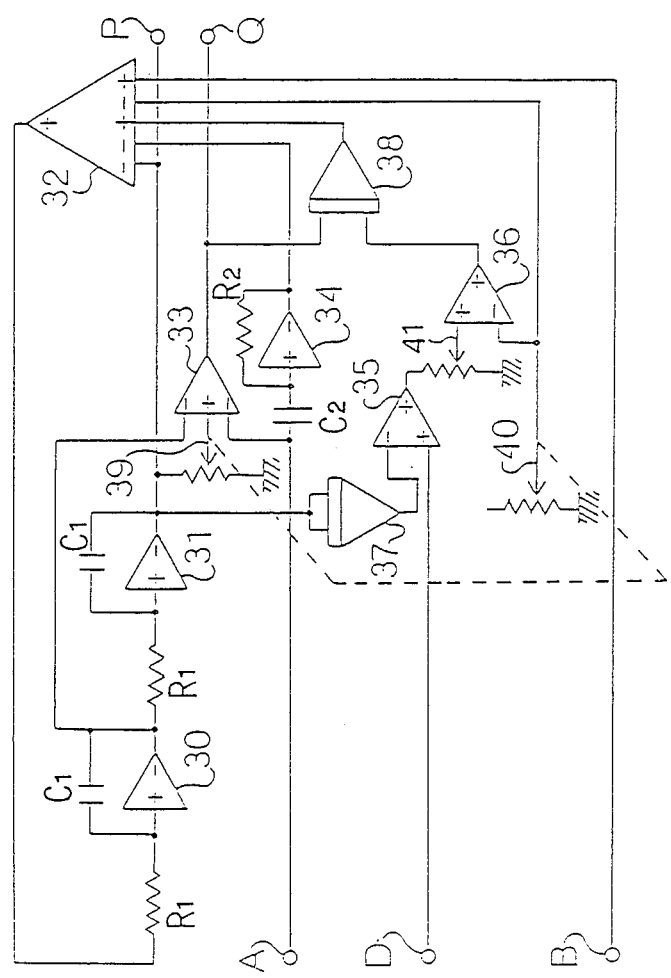
FIG. 4 is a circuit diagram showing the structure of the unitary oscillator.

Referring to FIG. 4, the unitary oscillator includes seven operational amplifiers 30 to 36. In FIG. 4, the signs "+" and "−" given to inputs and outputs represent a non-inverted condition and an inverted condition. As shown, the amplifiers 30 and 31 have an input connected to a resistor R1 so as to receive an input signal through the resistor, and a capacitor C1 is connected between the input and the output of these amplifiers. Therefore, the amplifiers 30 and 31 forms integrators, respectively. The amplifier 34 is adapted to receive an input signal through a capacitor C2, and a resistor $R_2$ is bridged between the input and the output, so that a differentiator is formed. The other amplifiers 32, 33, 35 and 36 are used as analog adders.

Further, there are provided a pair of multipliers 37 and 38 and three variable resistors 39, 40 and 41. The variable resistors 39 and 40 and interlocked. Three input terminals A, B and D and a pair of output terminals P and Q are provided.

The above mentioned elements 30 to 41 and the input and output terminals A, B, D, P and Q are interconnected as shown in FIG. 4, so that the amplifiers 30, 31 and 32 form a feedback loop circuit generating a basic oscillation, and the other elements constitute a Van der Pole type nonlinear oscillator.

With the above arrangement, if a positive voltage is applied to the input D, the amplitude of oscillation is magnified, and if a negative voltage is applied to the input D, the oscillation is weakened. The inputs A and B are interference input to the oscillation of the unitary oscillator itself, and therefore, are connected to other unitary oscillators. If such interference signals are not applied to the inputs A and B, the outputs P and Q have a phase difference of 90°. Then, if the interference input signals are applied, the difference in phase between the outputs P and Q is increased or decreased, and the frequency and amplitude of the signal from each of the outputs P and Q are also varied.

Figure 5:
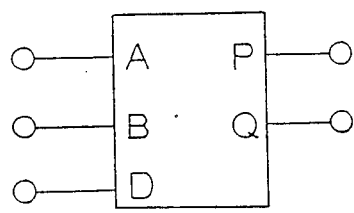
FIG. 5 shows a block indicative of the unitary oscillator.

The above mentioned unitary oscillator will be represented by a block shown in FIG. 5 in the succeeding drawings.

Figure 6:
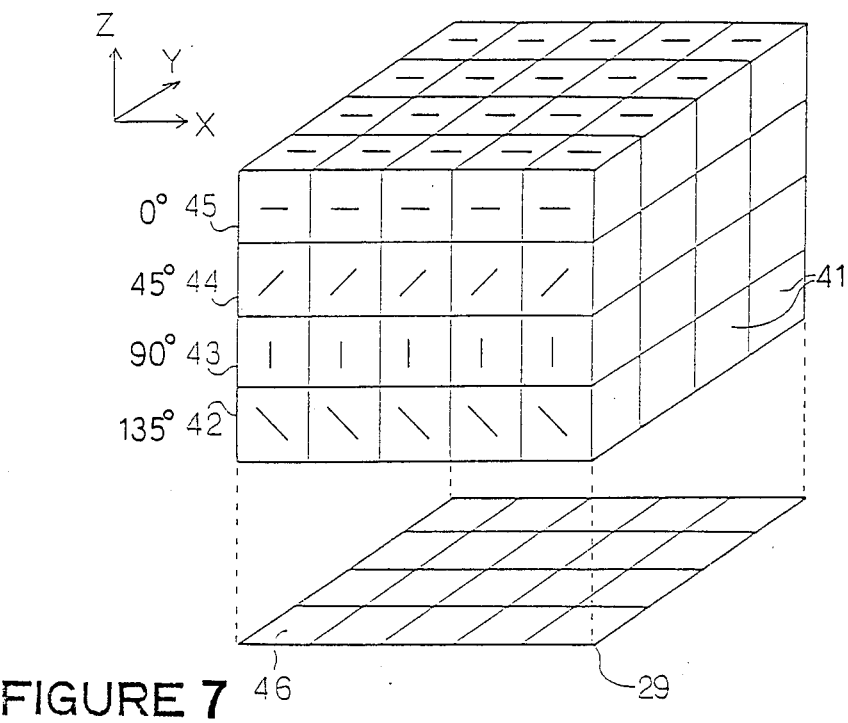
FIG. 6 illustrates the correspondence between the simple cell block and the inclination distribution plane.

Turning to FIG. 6, there is shown a corresponding relation between the contour image plane 29 produced by the contour simplifier 10 and the simple cell block 11. The simple cell block 11 is constituted of a plurality of simple cells 41 which are arranged in three-dimension and each of which is formed by the aforementioned unitary oscillator. If the contour image plane 29 has a mesh structure of 5×4, and if the directivity of the inclination is divided four stages, for example, 0°, 45°, 90° and 135°, the numbers of the simple cells in X-, Y- and Z- directions are 5, 4 and 4, respectively. Namely, the simple cell block 11 is formed of 80 Bsimple cells, and four simple cells 42 to 45 in Z-direction corresponds to the mesh 46 of the contour plane 29. Thus, four layers of simple cell groups are located in the simple cell block 11.

Figure 7:
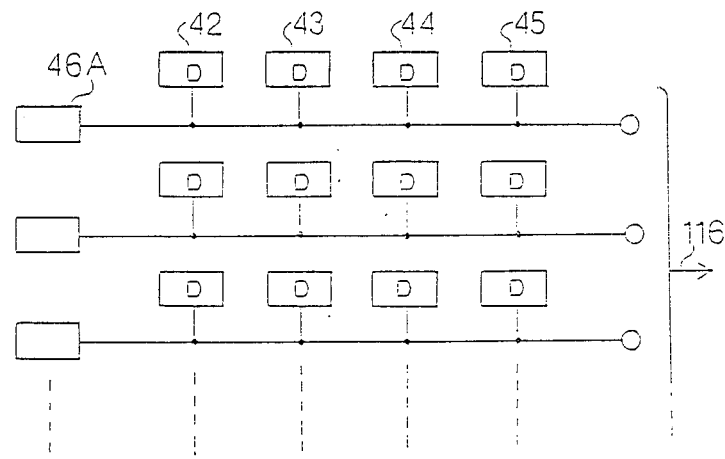
FIG. 7 illustrates the connection relation of the unitary oscillators in the respective hypercolumn of the simple cell block.

This location of four layers of simple cell groups is achieved by connecting the D inputs of each four unit oscillators 42 to 45 to one output 46A of the contour simplifier 10 which corresponds to one mesh 46 of the image plane 29, as shown in FIG. 7. The contour simplifier 10 operates to output a positive voltage signal to the D inputs of the four unitary oscillators positioned in one column of the simple cell block when the contour line passes through the corresponding mesh of the plane 29. Also, the contour simplifier 10 supplies a negative voltage signal to the D inputs of the four unitary oscillators positioned in one column when no contour line passes through the corresponding mesh of the plane 29.

A column of simple cells in Z-direction such as the column of the simple cells 42 to 45 will be called "hypercolumn" hereinafter, and a layer of simple cells extending in X-Y plane will be called "hyperplane" hereinafter.

Each simple cell receives interference inputs from other simple cells in the same hypercolumn, and interference inputs from other simple cells in the same hyperplane. Each simple cell also receives the outputs of the clock oscillator 12 and the memory block 13. As a result, each simple cell changes its oscillation condition under influence of these inputs.

Figure 8:
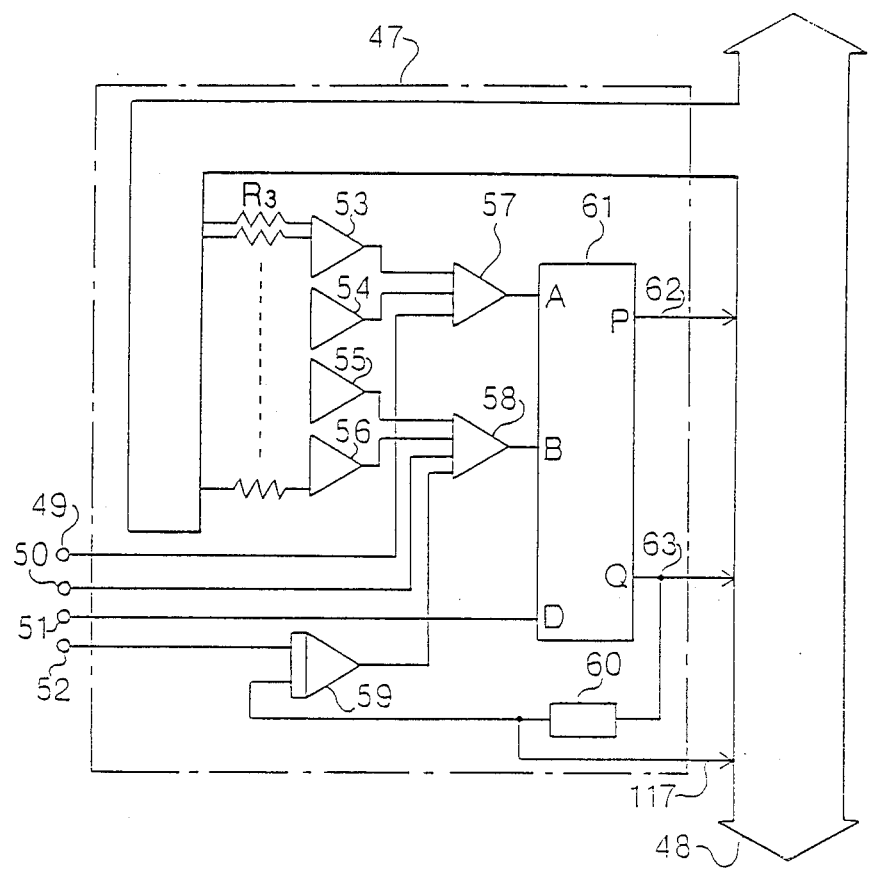
FIG. 8 is a circuit diagram of the simple cell.

Referring to FIG. 8, there is shown an internal structure of the simple cell, which is generally shown by Reference Numeral 37. Each simple cell 47 is coupled to an internal bus 48 provided in the simple cell block. The output signals of all the simple cells pass through the internal bus 48. Further, the simple cell 47 has first and second inputs 49 and 50 receiving a pair of cell clock signals derived from the output of the clock oscillator. The simple cell 47 also includes a third input 51 connected to the corresponding output of the contour simplifier 10. A fourth input 52 of the simple cell receives an output signal from of the memory block 13, which corresponds to the output 26 shown in FIG. 2.

The simple cell includes six analog address 53 to 58, a multiplier 59, a pulse generator 60 and a unitary oscillator 61 which are interconnected and also connected to the inputs 49 to 52 and the internal bus 48 as shown in FIG. 8.

The unitary oscillator 61 has the P and Q outputs coupled through lines 62 and 63 to the internal bus 48. The adders 53 and 55 receive the P and Q outputs of the other simple cells in the same hypercolumn through gain adjusting resistors $R_3$. On the other hand, the adders 54 and 56 also receive through gain adjusting resistors the P and Q outputs of adjacent other simple cells in the same hyperplane.

Specifically, the connection between the simple cells in the same hypercolumn is such that the ampltitudes of the P and Q outputs of each simple cell are weakened by the P and Q outputs of the other simple cells. The reason for this is that the simple cells in the same hypercolumn correspond to segments of different directions and therefore it is necessary to weaken the output of each cell so that one dominant direction is clarified.

Figure 9:
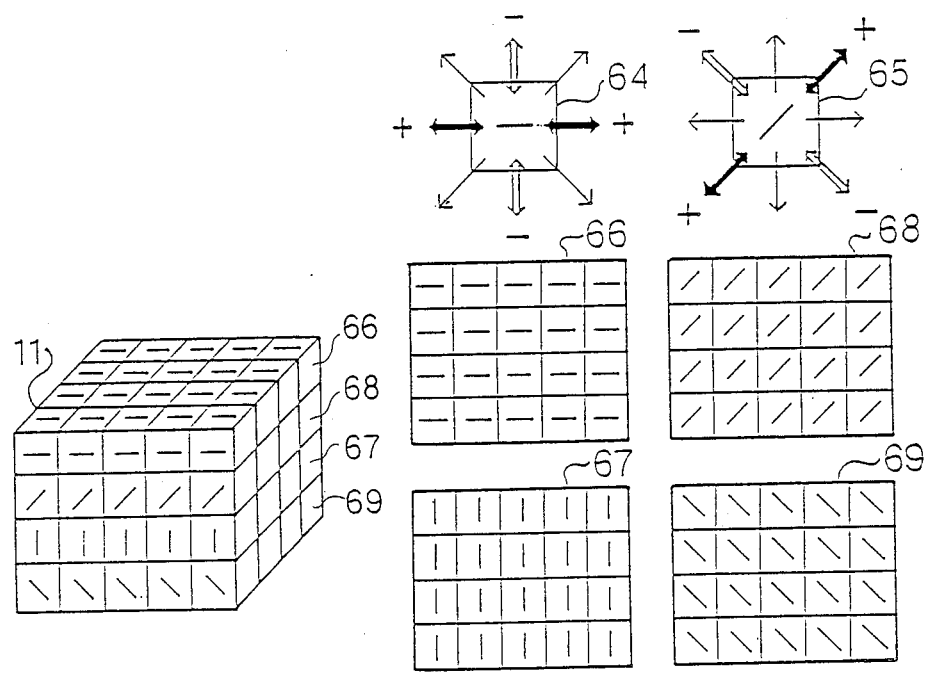
FIG. 9 illustrates the directivity of each simple cell in the simple cell block and also shows the connection relation between the adjacent simple cells in the same hyperplanes.

Referring to FIG. 9, Reference Numerals 64 and 65 show the directivity of two typical simple cells. Also, FIG. 9 illustrates the top view of the four hyperplanes 66 to 69 with the inclined segment in each simple cell showing the inclination of the contour line to which the simple cell is reactive. As seen from FIG. 9, all the simple cells in the same hyperplane have the same direction of inclination. This relation of inclination is realized by selecting the polarity of the signal inputted to the address 54 and 56.

Specifically, the simple cells 64 and 65 are connected through the bus 48 to adjacent simple cells in the directions shown by bold black arrows in such a polarity as to emphasize the oscillation of each cell. Further, the simple cells 64 and 65 are connected through the bus 48 to adjacent simple cells in the directions shown by bold white arrows in such a polarity as to weaken or deemphasize the oscillation of each cell. Therefore, the simple cells 64 and 65 show those constituting the hyperplanes 66 and 68, respectively. Thus. with the emphasizing and the deemphasizing of the simple cell outputs in the directions of the arrows, the reacting or activated simple cells having the same direction as that of the contour in the corresponding cell positions are chosen or connected. Incidentally, no interference is given in the direction of thin arrows in the simple cells 64 and 65.

As mentioned hereinbefore, the simplified contour given by the contour simplifier 10 is drawn on the mesh plane, and therefore, if the contour has a segment inclined in one direction and continuing over several meshes, the simple cells corresponding to the above segment and in alignment in the above direction are emphasized in oscillation of each other, and the cells positioned perpendicular to the above segment are weakened in oscillation. Accordingly, a struggle for existence is performed among the simple cells in the respective hyperplanes, and finally, the most dominant simple cell row remains in the respective hyperplane for each inclined segment of the contour. The oscillation of the other cells is suppressed.

The above struggle-for-existence operation is given by the adders 53 to 56 in each simple cell 47, as interaction in the simple cell block 11.

Next, explanation will be made on the clock oscillator 12 which acts as a reference exciting source for the simple cell block 11 and the memory block 13. The oscillator 12 operates to modify the frequency and the phase of its oscillation by the ouput of the simple cell block 11 and then gives a substantial influence to the simple cell block 11 and the memory block 13.

Figure 10:
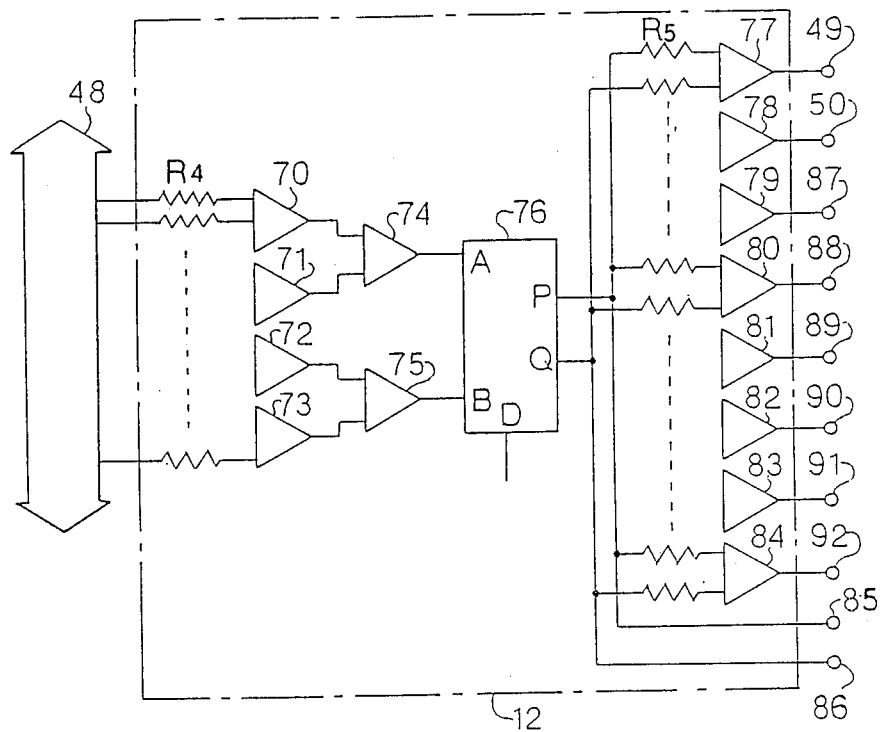
FIG. 10 is a circuit diagram of a clock oscillator.

As shown in FIG. 10, the clock oscillator 12 comprises adders 70 to 75 and 77 and 84 and one unitary oscillator 76 interconnected as shown in the drawings. The adders 70 to 73 receives all the output signals from the simple cell block 11 through the internal bus 48 and a group of gain adjusting resistors $R_4$. The outputs of these adders 70 to 73 are supplied through the adders 74 and 75 to the A and B input of the unitary oscillator 76. The P and Q outputs of this unitary oscillator 76 are supplied through a pair of output terminals 85 and 86 as a two-phase clock for the memory block 13. Further, the P and Q outputs of the unitary oscillator are coupled through another group of group of gain adjusting resistors $R_5$ to the adders 77 to 84 whose outputs 49, 50, 87 to 92 give in pair a common two-phase clock for respective hyperplanes. Namely, four pairs of outputs 49 and 50, 87 and 88, 89 and 90, and 91 and 92 are four two-phase clocks for the four hyperplanes, respectively. For example, the pair of outputs 49 and 50 are the inputs 49 and 50 of all the simple cells 47 (as shown in FIG. 8) in the same hyperplane.

Therefore, the adders 70 to 73 cooperate to sum all the output signals of the simple cell block 11 under suitable gain adjustment and in polarity combination, and then give interference to the unitary oscillator 76. As a result, the oscillation mode of the unitary oscillator 76 represents the consolidation of the oscillation conditions (amplitude, phase and frequency) of all the simple cells in the simple cell block 11. This consolidated oscillation condition is fed back through the two-phase clocks 85 and 86 to the memory block 13 and through the four two-phase clocks 49, 50, 87 to 92 to the simple cell of the four hyperplanes. With this feedback, the struggle-for-existence between the simple cells in the respective hyperplanes are facilitated, so that an activated cell pattern in the simple cell block is quickly decided.

Now, explanation will be made on the memory block 13, which includes a group of unitary oscillators. In brief, an oscillation having a waveform corresponding to one graphic pattern is generated by a plurality of unitary oscillators, which is called "unitary memory". All the unitary memories in the memory block is energized by the two-phase clocks 85 and 86 from the clock oscillator, and at the same time, competition is caused among the unitary memories so that there is finally maintained the oscillation of the unitary memory most matched to the oscillation of the simple cell block. In the course of this competition, the oscillation is fed back to the simple cell block 11 so that the competition is performed in combination of the memory block 13 and the simple cell block 11. The feedback from the memory block to the simple cell block corresponds to the feedback signal 7 in FIG. 1.

Figure 11:
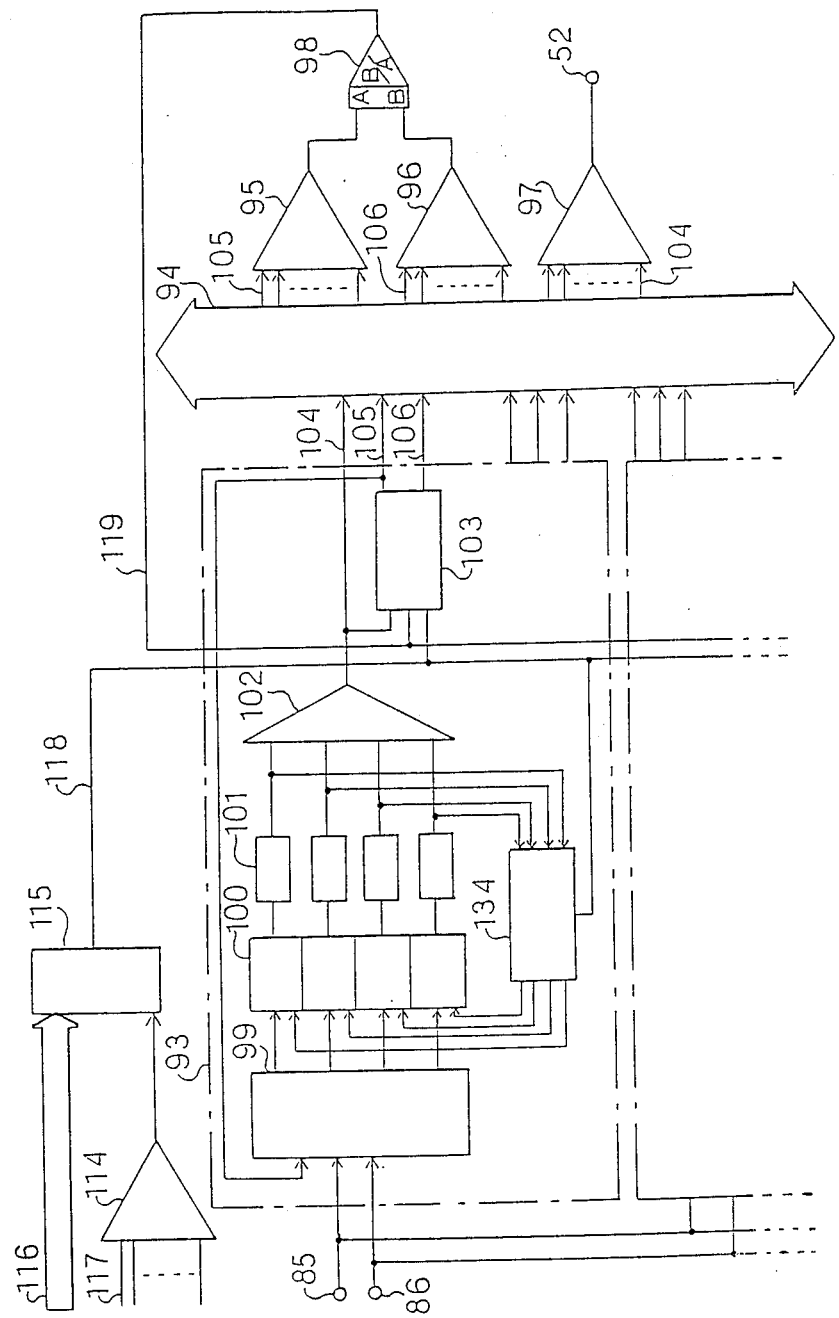
FIG. 11 is a circuit diagram of a memory block.

Referring to FIGS. 11 to 14, there is shown the structure of the memory block 13. As shown in FIG. 11, the memory block 13 comprises a plurality of unitary memories 93 all of which have their outputs coupled through a memory internal bus 94 to three adders 95 to 97. Two of the adders 95 and 97 are connected at their outputs to a divider 98.

As shown in FIG. 11, each of the unitary memories 93 comprises a clock gate 99, a unitary oscillator group 100, pulse generators 101, an adder 102, a gate width controller 103, and a unit emphasizing circuit 134, which are interconnected as shown in the drawing. In addition, the memory block 13 also includes an adder 114 and a normalizer 115. Signal lines 104 to 106 and 116 to 119 are connected to various circuits as shown in FIG. 11. The signal lines 86, 116, 117 and 52 are the same as those shown by the same Reference Numerals in other drawings.

Figure 12:
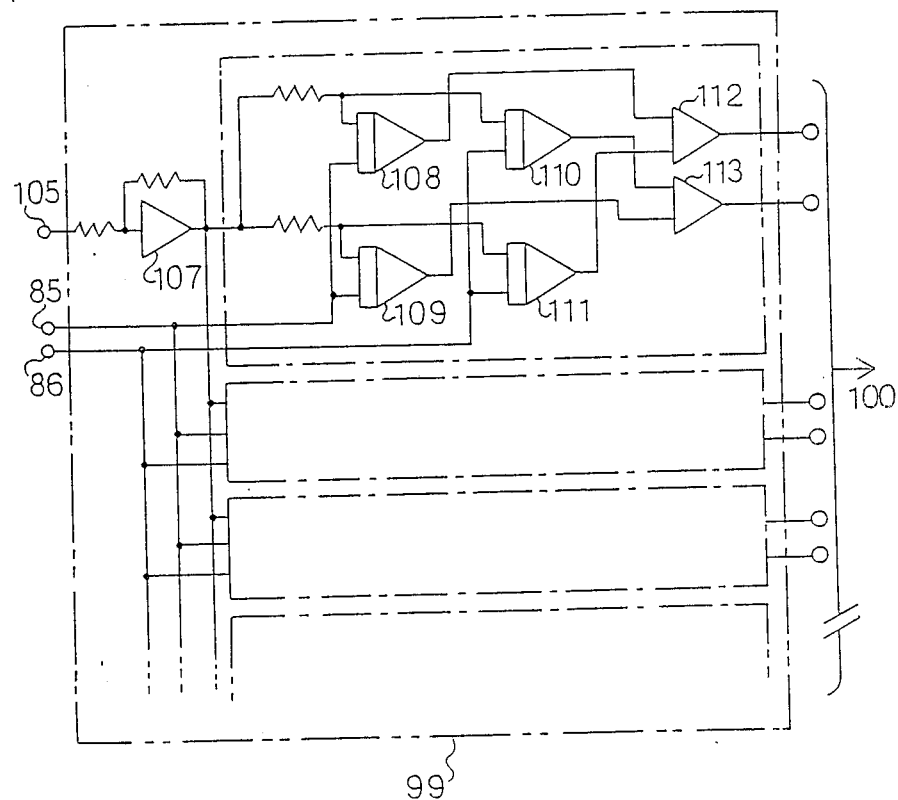
FIG. 12 is a circuit diagram of a clock gate of the memory block.

Turning to FIG. 12, there is shown the circuit structure of the clock gate 99, which includes a gain setting circuit 107, four multipliers 108 to 111 and two adders 112 and 113 interconnected as shown in the drawing.

Figure 13:
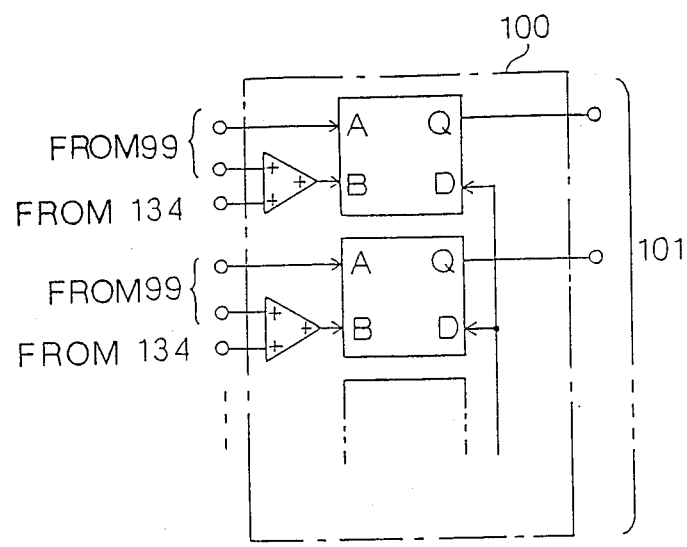
FIG. 13 is a circuit diagram showing the circuit structure of a unitary oscillator group in the memory block.

The unitary oscillator group 100 includes a plurality of unitary oscillators located in parallel as shown in FIG. 13. Each unitary oscillator has the A input adapted to receive the corresponding output of the clock gate 99, and the B input receiving through an associated adder the corresponding outputs of the clock gate 99 and the unit emphasizing circuit 134. The D input of each unitary oscillator is energized by the same signal, and the Q output of the unitary oscillator is connected to the corresponding pulse generator 101.

Figure 14:
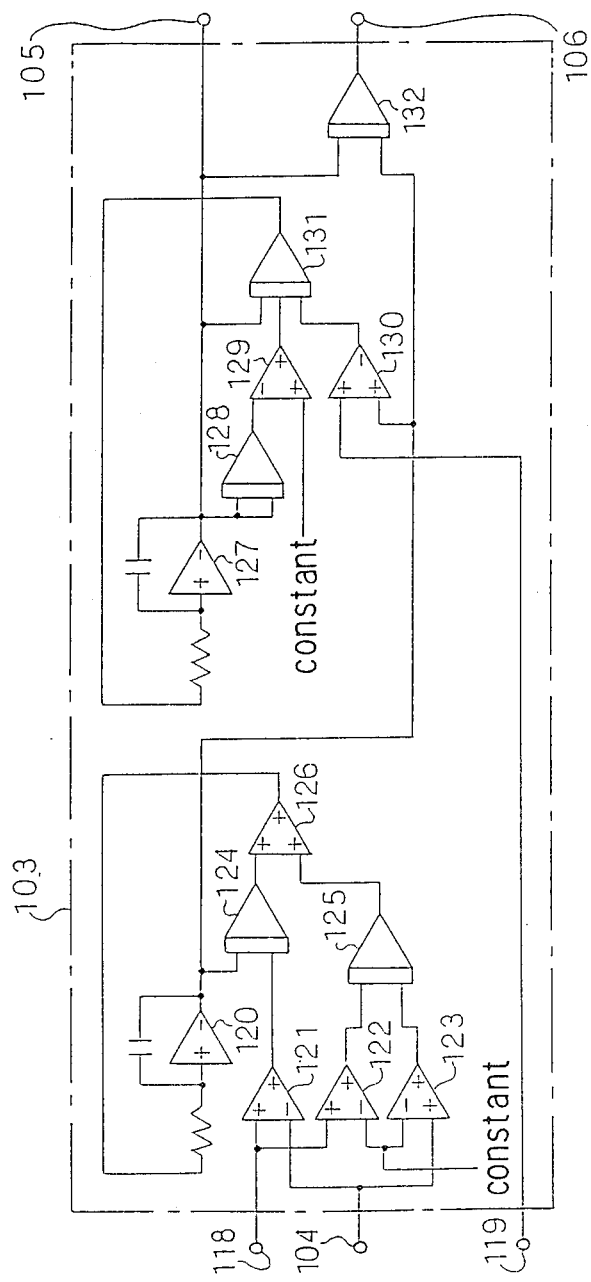
FIG. 14 is a circuit diagram of a gate width controller in the memory block.

Referring to FIG. 14, the gate width controller 103 comprises two integrators 120 and 127, six adders 121 to 123, 126, 129 and 130, and five multipliers 124, 125, 128, 131 and 132, which are connected as shown in the drawing.

The above mentioned memory block 13 operates as follows: The memory block 13 receives as a reference exiciting signal the output signals 85 and 86 of the clock oscillator 12. These signals 85 and 86 are converted in the clock gate 99 into a two-phase signal in proportion to the gate width control signal 105, and then outputted through the adders 112 and 113 to the unitary oscillator group 100. The above mentioned proportional operation is performed by the group of multipliers 108 through 111. Each pair of outputs, which constitute one two-phase clock, are connected to the A and B inputs of one unitary oscillator. Therefore, the number of the circuits each containing the multipliers 108 to 111 and the adders 112 and 113 is the same as that of the unitary oscillators constituting the unitary oscillator group 100.

The clock gate 99 acts to adjust the magnitude of excitation for the unitary oscillator group 100. Therefore, if the clock gate 99 weakly excite one unitary oscillator, it outputs a signal having a small amplitude.

The unitary oscillator group 100 corresponds to one graphic pattern as its whole. For the purpose, in accordance with a specified pattern the unitary oscillator group 100 generates a signal analogous to the signal waveform outputted from the clock oscillator 12. In order to synthesize the signal for each partial waveform unit, the unitary memory 93 contains the group 100 of unitary oscillators, the pulse generating circuit 101, the adder 102, and the unit emphasizing circuit 134. The resultant addition signals 104 from all the unitary memories 93 are fed through the bus 94 to the adder 97, whose output 52 is fed to all the simple cells of the simple cell block 11, i.e., the input 52 of the simple cell 47 shown in FIG. 8.

The gate width controller 103 operates in response to the normalization signal 118, the coverage value signal 119 and the output of the adder 102. The normalizer 115 operates to divide the total sum of the outputs of all the simple cells in the block 11 given by the adder 114, by the number of the meshes through which the contour passes and which is derived from the normalization signal 118, the average value signal 119 and the output of the adder 102. The normalizer 115 operates to divide the total sum of the outputs of all the simple cells in the block 11 given by the adder 114, by the number of the meshes through which the contour passes and which is derived from the contour simplifier 10. The output of this normalizer 115 is the normalization signal 118, and since the construction of the normalizer is known to persons skilled in the art, further explanation will be omitted. In fact, as mentioned above, the adder 114 receives the outputs of only the simple cells which corresponds to the input pattern, as shown by the mark "*" in FIG. 1. Therefore, the normalization signal 118 is indicative of the output waveform of the remaining or surviving simple cells of the block 11 at a possible maximum amplitude irrespectively of the number of the surviving cells. This signal 118 is supplied to the unit emphasize 134 and the gate width controller 103.

The average value signal 119 is indicative of the average of the gate width control signals 105 and 106 of all the unitary memories 93, and is given by the multiplier 98.

The unit emphasizer 134 examines the adaptation of the output waveform for each unitary oscillator in the oscillator group 100, and individually excites these unitary oscillators.

As shown in FIG. 14, a first half of the gate width controller 103, which includes the circuit elements 120 to 126, produces from the input signals 104 and 118 an output signal which is increasing when the peaks of the synthetic waveform 118 of the simple cell block outputs are consistent in time with the peaks of the output 104 of the unitary oscillator group 100 and under the condition that the peak of the output of the first half circuit portion itself coincides with the peak of the two signals 104 and 118.

The second half of the gate width controller 103 including the circuit elements 127 to 132 operates to acceleratedly increase the gate width control value when the output signal of the first half portion becomes larger than the average 119 of the all gate width controller outputs.

With the above mentioned operation of the gate width controller 103, the competition is performed between the unitary memories. Of course, as mentioned hereinbefore, some change will appear in the oscillations in the simple cells of the block 11 because of this competition in the memory block 13.

Figure 15:
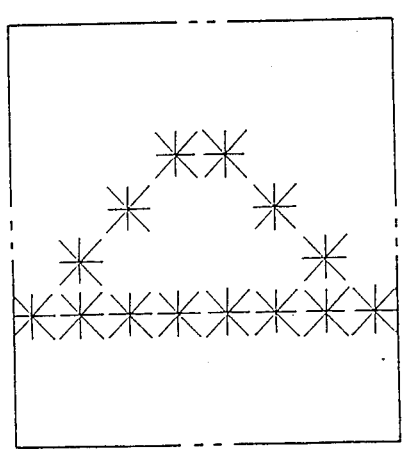
FIG. 15 shows an example of the pattern recognition.
Figure 15:
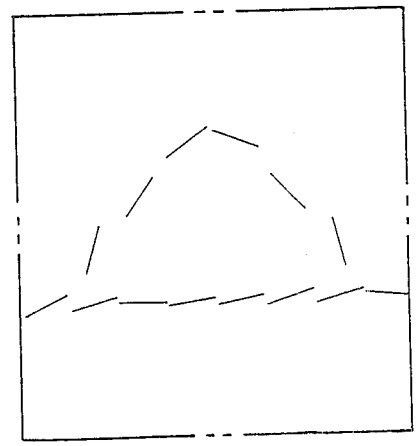

Next, explanation will be made on the conditions of various parts observed by the moniter 133, when the pattern recognition apparatus is in operation. FIG. 15 (a) shows one example of the contour lines appearing on the plane of the meshes 29, which is in the form of a triangle in this case. FIG. 15(b) illustrates the distribution of the finally surviving simple cells in the block 11 with the assigned directivity of these surviving ceolls. In the figure, different direction cells belong to difference hyperplanes, respectively. It will be noted that the inclination of the contour is detected almost properly and the detected inclination becomes finally binding.

Figure 16:
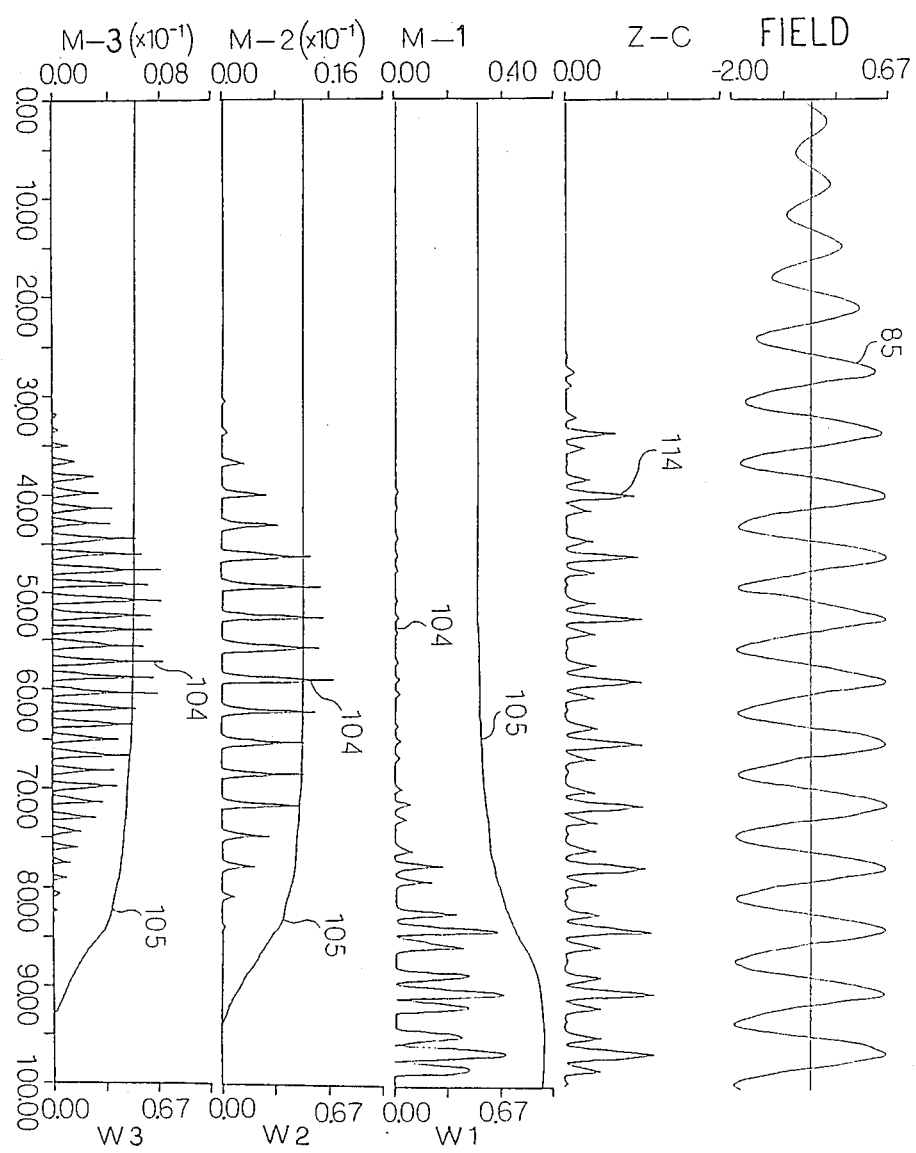
FIG. 16 is a waveform diagram showing signals at various points.

Referring to FIG. 16, there are shown various waveforms at different points in the course of the above mentioned pattern recognition, in which the axis of abscissas is the time axis starting from the detection of the graphic pattern, and the axis of ordinates indicates the amplitude of various signals. "FIELD" shows the signal 85; "Z-C" shows the output of the adder 114; "M-3", "M-2" and "M-1" shows the outputs 104 of three unitary memories, which are in the form of pulse trains; and "W1", "W2" and "W3" show the gate width control signals 105, which change smoothly.

With input of a graphic pattern, the contour simplifier outputs the mesh patterns as shown in FIG. 15(a), and then, a group of D signals corresponding to the mesh pattern are applied to the simple cell block where the respective simple cells gradually increase their oscillation. As a result, the output of the block oscillator 12 becomes large. By influences of these circuits 11 and 12, all the unitary memories start their operation. However, as seen from the gate width control signals shown in FIG. 16, since the waveform patterns of the outputs "M-2" and "M-3" are not coincident with that of the output "Z-C", the outputs "W2" and "W3" become small. On the other hand, the surviving signal "M-1" can be regarded to correspond to the inclination distribution of the contour shown in FIG. 15(b).

Figure 17:
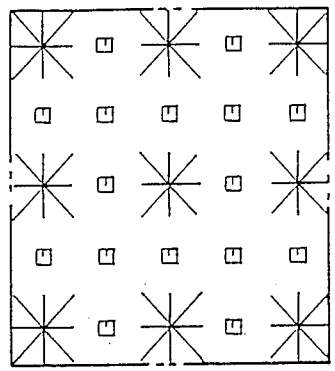
FIG. 17 shows another example of the pattern recognition.
Figure 17:
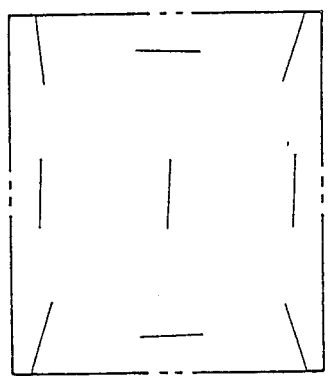
Figure 17:
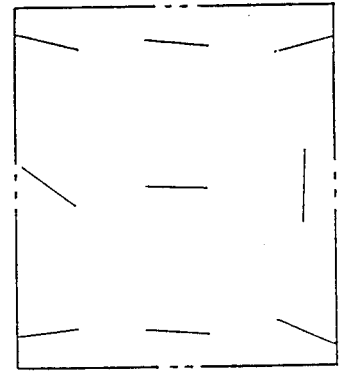

Turning to FIG. 17, there is shown another example of the pattern recognition. FIG. 17(a) shows a mesh distribution on the plane 29, and FIGS. 17(b) and (c) illustrates the result of recognition. As shown in FIG. 17(a), if the pattern can be deeded to be either a horizontal striped pattern or a vertical striped pattern, the pattern recognition apparatus circulates between the two conditions shown in FIGS. 17(b) and (c) because of slight voltage fluctuation and noise occurring in the circuits of the apparatus.

Figure 18:
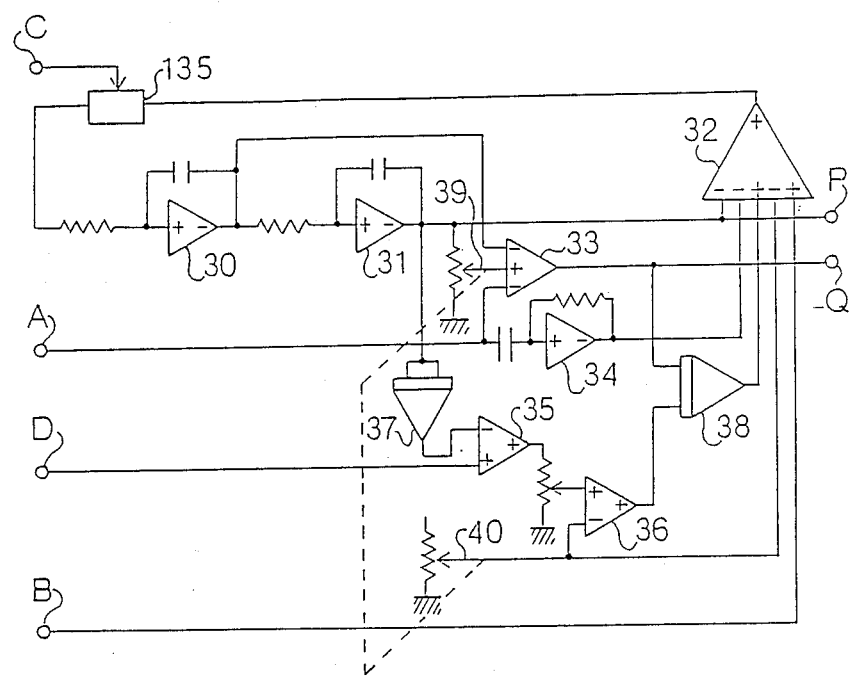
FIG. 18 is a circuit diagram similar to FIG. 4 but showing another structure of the unitary oscillator.
Figure 19:
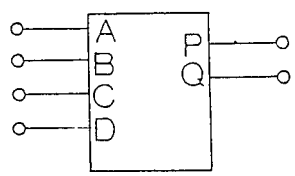
FIG. 19 shows a block indicative of the unitary oscillator shown in FIG. 18.

Referring to FIG. 18, there is shown another example of the unitary oscillator. In order to adjust the basic oscillation frequency of the unitary oscillator itself, it comprises a gain controller 135 provided in the basic oscillation generating loop consisting of the integrators 30 and 31 and the adder 32. The gain controller 135 is adjusted through an additional input terminal C. This unitary oscillator is indicated of a block shown in FIG. 19.

If the unitary oscillator of FIG. 18 is used in the unitary memory and the C input is controlled by the monitor 133, when the initial content stored in the memory block is completely inconsistent with the given pattern, it is possible to search a new consistent pattern by changing the output of the memory.

This unitary oscillator is advantageous is that it is possible to continuously change the memory pattern to various patterns with only a limited number of unitary oscillators, and in that the continuous changing can be performed in perfect parallel for all the memories so that it can have a processing speed higher than that of the conventional pattern recognition apparatus.

Figure 20:
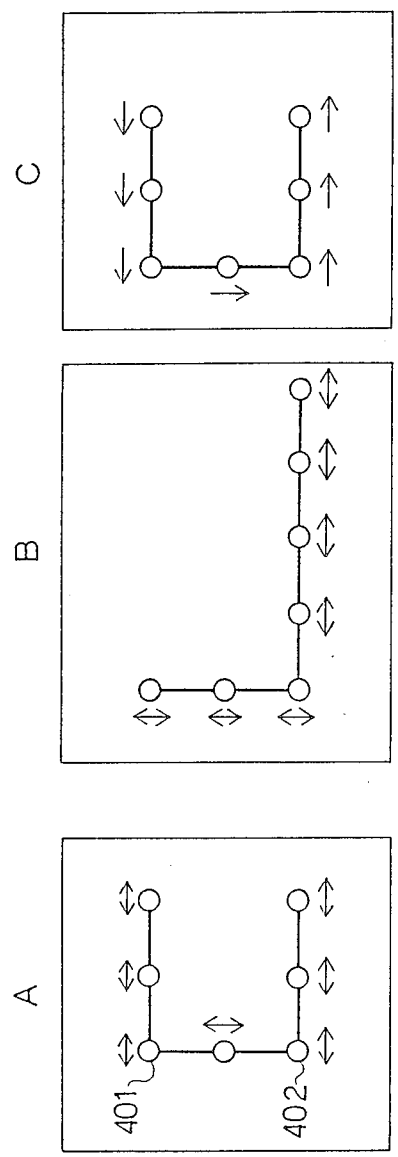
FIG. 20 illustrates three examples of patterns.

The above mentioned pattern recognition has the simple cells provided in correspondence to various inclinations of segments. However, such apparatus cannot distinguish the patterns having a returned portion as shown in FIG. 20(a) and the pattern not having a returned portion as shown in FIG. 20(b).

In order to enable such distinction, the information consolidator 2 comprises a required number of hyperplanes corresponding not only to the inclinations of the segments but also to possible directions of the segments, and such a modification is made that the information consolidator does not output an oscillation pattern coresponding to the return at bent or corner points of the given pattern.

Figure 21:
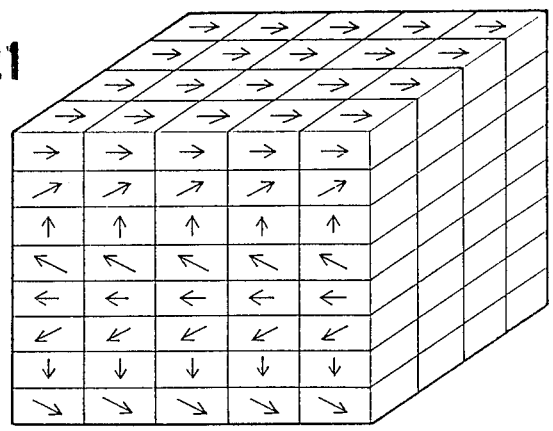
FIG. 21 illustrates the directivities assigned to respective simple cells in the simple cell blocks of the second embodiment.
Figure 22:
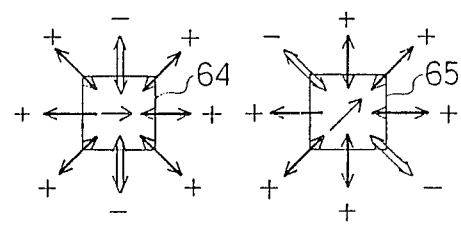
FIG. 22 illustrates the directivity in coupling between between adjacent simple cells.

For this purpose, the simple cell block 11 has a hyperplane structure shown in FIG. 21, in which various arrows indicate the directivity of the respective simple cells. In the same hyperplane, each simple cell is coupled with adjacent simple cells in excitation emphasizing polarity excluding the cells in the directions perpendicular to the direction assigned to the above simple cell, as shown in FIG. 22.

Next, description will be made on the method of obtaining the oscillation mode of the unitary oscillator 76 for indicating the directivity. If the given pattern has corner or bent points 401 and 402 as shown in FIG. 20(a), a human being will recognize it as it is, but the first embodiment of the pattern recognition apparatus may erroneously recognize it as shown in FIG. 20(b), because each simple cell in cell block corresponds to a pair of opposite directions.

If the patterns is traced through the bent points 401 and 402 as arrows shown in FIG. 20(c), the upper and lower horizontal segments can be distinguished. This second embodiment is based on this though. Namely, in the respective hypercolumn one simple cell of the same direction as that of the corresponding mesh is emphasized in oscillation, and the synthetic output from the adder 114 receiving all the outputs of the simple cell block is supplied to the memory block 13, in a manne similar to the first embodiment.

Figure 23:
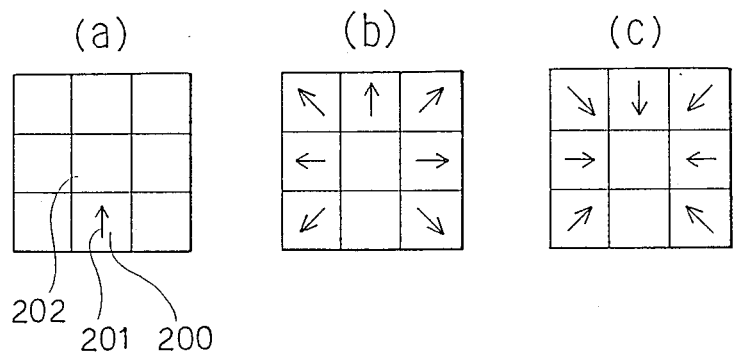
FIG. 23 illlustrates the connection relation between adjacent simple cells for clarifying the directivity of the contour segment at a corner portion.

Now, description will be made on the way of emphasizing the oscillation of only the simple cell positioning at the corner of the contour. Consider a hyperplane portion composed of 3 lines and 3 rows as shown in FIG. 23, and assume that the corner point is positioned at the center of the 3×3 simple cells. Also, assuming that there exist a simple cell 200 having a directivity 201 toward to the center of the hyperplane portion as shown in FIG. 23(a). Namely, a portion of the given contour passes through the hypercolumn having the simple cell 200, and of that hypercolumn the simple cell 200 having the same direction as that of the contour portion is excited in oscillation. In this condition, an arrow passing through a corner point, i.e., the center simple cell 202 is one of arrows shown in FIG. 23(b). Furthermore, FIG. 23(c) shows arrows which have a possibility of opposing to the direction of the simple cell 202. Therefore, it is so constructed that the simple cell 200 supplies an excitation emphasizing signal to the respective simple cells shown by the arrow in FIG. 23(b), and also supplies to the respective simple cells shown by the arrow in FIG. 23(c). As a result, there remain only a set of arrows which pass through the corner point of the contour.

In the above mentioned manner, the inter-exciting relation is established in accordance with the continuity of direction between each group of adjacent simple cells as shown in FIG. 23, so that there is performed the distinction including the directivity of partial contours even if any pattern is given.

Figure 24:
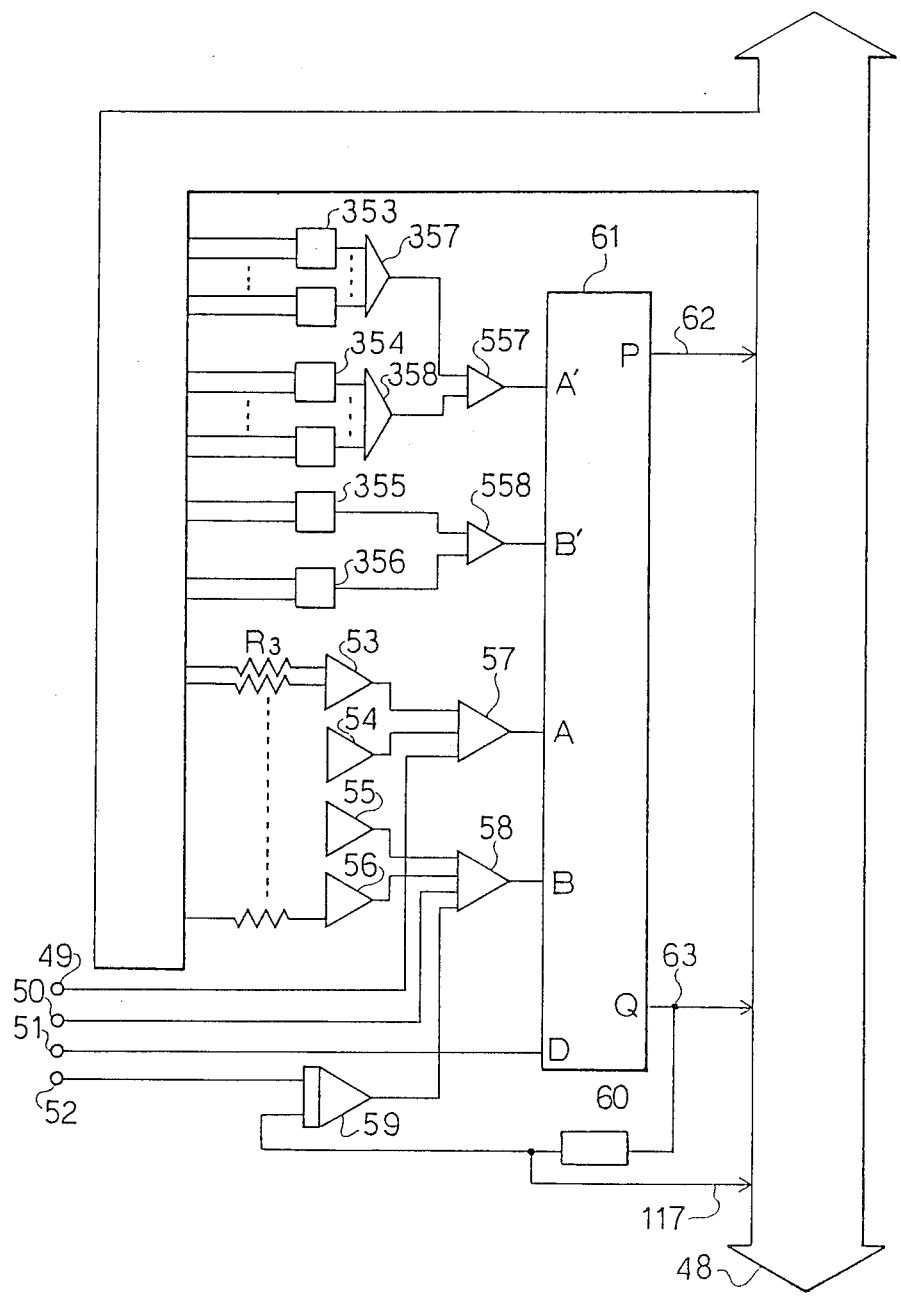
FIG. 24 is a circuit diagram similar to FIG. 3 but showin the clock oscillator for use in the second embodiment.

Turning to FIG. 24, there is shown one example of the simple cell used in this improved pattern recognition apparatus. In FIG. 24, elements similar to those shown in FIG. 8 are given the same Reference numerals. This simple cell has input ports 353 receiving the signals through the bus 48 from the adjacent simple cells in the relation as shown in FIG. 23(b), and input ports 354 receiving the signals through the bus 48 from the adjacent simple cells in the relation as shown in FIG. 23(c).

Further, the simple cell includes an input port 355 receiving the outputs 62 and 68 of the cell itself through the bus 48, and an input port 356 receiving the outputs of the cell in the same hypercolumn having the direction opposite to that of the cell itself. These inputs 353, 354, 355 and 356 are supplied through a group of adders 357, 358, 557 and 558 to inputs A' and B' of a unitary oscillator 61.

Figure 25:
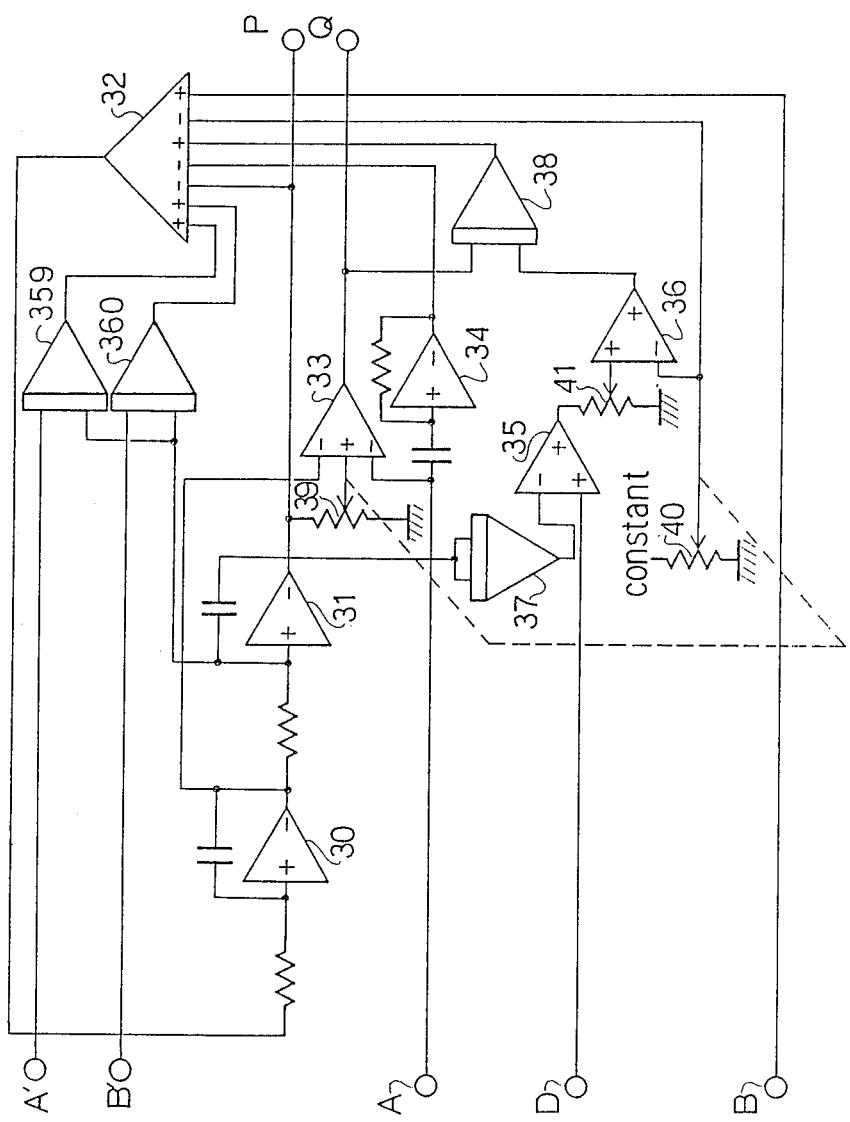
FIG. 25 is a circuit diagram similar to FIG. 4 but showing the unitary oscillator for use in the second embodiment.

This unitary oscillator 61 used in the simple cell shown in FIG. 24 includes a pair of adders 359 and 360 as shown in FIG. 25, in which the elements similar to those shown in FIG. 4 are given the same Reference Numerals. These adders 359 and 360 have their one inputs connected to the inputs A' and B', respectively and their other inputs connected commonly to the input of amplifier 31. The outputs of the adders 359 and 360 are connected to the adder 32.

As regards the other matters including the connection in the same hyperplane and the connection between the simple cells of different hyperplanes, the second embodiment has the same construction as that of the first embodiment.

Thus, surviving simple cells are determined by the respective directivities, so that the resultant pattern is determined by the directivities.

The output 117 of the simple cell block 11 is fed to the memory block which is different from the circuit 11 only in one point that the adder 114 has inputs of the number corresponding to the outputs of the simple cell block having the increase hyperplanes as shown in FIG. 21.

As seen from the above, the pattern recognition apparatus comprises a number of analog circuits which are driven in perfect parallel, and so, it cannot have a delay in processing, differently from sequential processing executed in digital processors.

Even if a given pattern is an ambiquous pattern or a figure whose data is not stored in the memory, any result of recognition can be given by adjusting the clocks supplied to the simple cell block and the memory block so that these circuits mutually change their conditions.

Since the main parts of the apparatus are constituted by using the unitary oscillators of the same structure, it can have a high reliability.

Further, if there is given a pattern to which two or more interpretations can be made, the apparatus can wander between those interpretations. This means that it is possible to provide a recognition system which is capable of freely complying with an external condition and which can simulate a waviness in interpretation of a human being.

In the above embodiments, the unitary oscillator is constituted in the form of a van der pole nonlinear oscillating circuit having a state basic oscillation characteristics, and so, the waveform stability is very excellent. But, the unitary oscillator can be formed in other nonlinear circuit types. In addition, the above recognition apparatus is of analog circuit type, but it can be formed of digital circuits capable of computing a nonlinear oscillation.

The invention has thus been shown and described with reference to specific embodiments. However, it should be noted that the invention is in no way limited to the details of the illustrated structures but changes and modifications may be made within the scope of the appended claims.

We claim:

1. A pattern recognition apparatus which includes a pattern preprocessing part having a plurality of outputs, a clock oscillator, and an information consolidator and a memory having a plurality of nonlinear oscillating circuits, respectively, characterized in that each of the oscillating circuits includes a plurality of inputs for controlling the oscillation condition and at least one output;

the output of each oscillating circuit in the information consolidator being interconnected to predetermined inputs of other oscillating circuits in a predetermined relation, and the inputs of the oscillating circuits being coupled to the outputs of the pattern preprocessing part in a predetermined distribution;

the clock oscillator being connected to receive as a main exciting signal, the sum of a group of signals obtained by phase-adjusting the outputs of a substantial part of oscillating circuits contained in the information consolidator;

the respective oscillating circuits in the memory being connected to receive, as a main exciting signal, the output of the clockoscillator, and said oscillating circuits also being divided into a predetermined number of groups so that the sum of the outputs of the oscillating circuits in each group given an elementary signal of a pattern reference memory data; and further including waveform comparison means for comparing the elementary signal of the memory data with the direct sum of the outputs of the said substantial part of oscillating circuits in the information consolidator, so that the result of comparison is applied to inputs of the oscillating circuits of the memory.

2. An apparatus as claimed in claim 1 wherein the oscillating circuits in the information consolidator are divided into a plurality of groups, each including a plurality of oscillating circuits, the respective groups of the oscillating circuits being assigned to respective partial planes of a plane capable of representing an output pattern of the preprocessing part, and the oscillating circuits in the information consolidator being connected at their predetermined inputs to the preprocessing part in such a manner that all the oscillating circuits contained in respective oscillating circuit groups corresponding to the partial planes on which respective segments of the output pattern from the preprocessing part are positioned are excited.

3. An apparatus as claimed in claim 2 wherein each group of oscillating circuits includes oscillating circuits respectively corresponding to possible directions of the segments each of which is dissolved from the contour of the given pattern and passes through one partial plane of the above mentioned plane, each said oscillating circuits being connected at its output to adjacent oscillating circuits having the same or opposite directivity to that oscillating circuit so as to strongly excite said adjacent oscillating circuits, each oscillating circuits being connected at its output to adjacent oscillating circuits having the directivity perpendicular to that of the oscillating circuit so as to weaken the oscillation of said adjacent oscillating circuits, and each oscillating circuits being connected to neighbor oscillating circuits in such a manner as to strongly excite the oscillating circuits having directivities diverging from an oscillating circuit adjacent to the above mentioned oscillating circuit in its directivity, but to weaken the oscillation of the oscillating circuits having directivities converging to the above segment oscillating circuit.

4. An apparatus claimed in claim 3 wherein each of the oscillating circuits includes at least one input for magnifying its output and at least one input for weakening its output.

5. An apparatus claimed in claim 4 wherein each nonlinear oscillating circuit is of the van der pole type.

* * * * *